(12) United States Patent
Whatmough et al.

(10) Patent No.: US 11,188,814 B2
(45) Date of Patent: Nov. 30, 2021

(54) SYSTOLIC CONVOLUTIONAL NEURAL NETWORK

(71) Applicant: Arm Limited, Cambridge (GB)

(72) Inventors: Paul Nicholas Whatmough, Cambridge, MA (US); Ian Rudolf Bratt, Portola Valley, CA (US); Matthew Mattina, Boylston, MA (US)

(73) Assignee: Arm Limited, Cambridge (GB)

( * ) Notice: Subject to any disclaimer, the term of this patent is extended or adjusted under 35 U.S.C. 154(b) by 875 days.

(21) Appl. No.: 15/945,952

(22) Filed: Apr. 5, 2018

(65) Prior Publication Data

US 2019/0311243 A1   Oct. 10, 2019

(51) Int. Cl.
*G06N 3/063*   (2006.01)
*G06N 3/04*   (2006.01)

(52) U.S. Cl.
CPC .............. *G06N 3/063* (2013.01); *G06N 3/04* (2013.01); *G06N 3/0454* (2013.01)

(58) Field of Classification Search
CPC ......... G06N 3/063; G06N 3/0454; G06N 3/04
See application file for complete search history.

(56) References Cited

U.S. PATENT DOCUMENTS

| | | | |
|---|---|---|---|
| 9,710,748 B2 | 7/2017 | Ross et al. | |
| 9,747,546 B2 | 8/2017 | Ross et al. | |
| 9,842,293 B2 * | 12/2017 | Young | G06N 5/04 |

OTHER PUBLICATIONS

Kim, D. et al, A Novel Zero Weight/Activation-Aware Hardware Architecture of Convolutional Neural Network [online], 2017 [ retrieved Mar. 18, 2021], Retrieved from Internet:<URL:https://ieeexplore.ieee.org/stamp/stamp.jsp?tp=&arnumber=7927222> (Year: 2017) (Year: 2017).*
Kim, D. et al, ZeNA: Zero-Aware Neural Network Accelerator [online], 2017 [retrieved Mar. 18, 2021], Retrieved from Internet: <URL: https://ieeexplore.ieee.org/stamp/stamp.jsp?tp=&arnumber=8013151> (Year:2017) (Year: 2017).*

(Continued)

*Primary Examiner* — Vincent Gonzales
*Assistant Examiner* — Bart I Rylander
(74) *Attorney, Agent, or Firm* — Leveque Intellectual Property Law, PC

(57) ABSTRACT

A circuit and method are provided for performing convolutional neural network computations for a neural network. The circuit includes a transposing buffer configured to receive actuation feature vectors along a first dimension and to output feature component vectors along a second dimension, a weight buffer configured to store kernel weight vectors along a first dimension and further configured to output kernel component vectors along a second dimension, and a systolic array configured to receive the kernel weight vectors along a first dimension and to receive the feature component vectors along a second dimension. The systolic array includes an array of multiply and accumulate (MAC) processing cells. Each processing cell is associated with an output value. The actuation feature vectors may be shifted into the transposing buffer along the first dimension and output feature component vectors may shifted out of the transposing buffer along the second dimension, providing efficient dataflow.

19 Claims, 6 Drawing Sheets

(56) References Cited

OTHER PUBLICATIONS

Y. H. Chen, J. Emer and V. Sze, "Eyeriss: A Spatial Architecture for Energy-Efficient Dataflow for Convolutional Neural Networks," 2016 ACM/IEEE 43rd Annual International Symposium on Computer Architecture (ISCA), Seoul, 2016, pp. 367-379. doi: 10.1109/ISCA.2016.40.

Jouppi et al., "In-Datacenter Performance Analysis of a Tensor Processing Unit," $44^{th}$ International Symposium on Computer Architecture (ISCA), Toronto, CA, Jun. 26, 2017.

Pete Warden, "Why GEMM is at the Heart of Deep Learning," https://petewarden.com/2015/04/20/why-gemm-is-at-the-heart-of-deep-learning/, Apr. 20, 2015.

Kevin Kiningham et al., "Design and Analysis of a Hardware CNN Accelerator," http://cs231n.stanford.edu/reports/2017/pdfs/116.pdf, Dec. 31, 2017.

\* cited by examiner

SYSTOLIC CONVOLUTIONAL NEURAL NETWORK

BACKGROUND

Artificial neural networks (ANNs) have found application in many areas, from the Internet of Things (IoT) to large datacenters. ANNs can be computationally intensive, which has motivated the development of specialized hardware accelerators for ANNs. These accelerators have the potential for lower power and higher performance. In particular, convolutional neural networks (CNNs) have proven to be useful for a wide range of classification and regression applications, most notably object classification in natural images. The core computation required for CNNs is a three-dimensional (3D) convolution, which may be implemented in software using an image-to-column (IM2COL) transformation of image data followed by generic matrix multiplication (GEMM) operation.

A hardware accelerator for a CNN may follow a similar approach, providing hardware acceleration for the IM2COL transformation and the GEMM operation. The most common approach for the GEMM operation is to use a systolic array, which consists of a two-dimensional (2D) grid of multiply-accumulate (MAC) units, each connected to its neighbors to pass operands and results in a regular fashion. Systolic arrays are efficient because the communication is kept local (register to register) for as long as possible, which reduces the number of static random access memory (SRAM) and main memory accesses. This approach is often referred to as 'operand re-use'.

However, one of the challenges with using a systolic array is designing hardware to perform the "dataflow" needed to rearrange the input data (and output data) in a suitable pattern such that the correct computation is performed. The IM2COL operation is part of this data rearrangement. However, for application in small devices, such as IoT devices, there is a desire that the data rearrangement should have a simple memory layout in order to facilitate a practical implementation. In addition, operand re-use should be maximized where possible.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

The various apparatus and devices described herein provide a hardware accelerator for a convolutional neural network (CNN) that provides efficient operand re-use without requiring a complicated memory layout.

In accordance with certain representative embodiments of the present disclosure, there is provided a circuit for performing convolutional neural network computations for a neural network A major application of convolutional neural network (CNNs) is the recognition of features in a digital image consisting of a matrix of pixel values. This may be a three-dimensional matrix for a color image or a two-dimensional matrix for a grayscale image. A CNN extracts features from an input image by performing a convolution operation between the image matrix and a matrix of values termed a 'filter', 'kernel' or 'feature detector'. The convolution operation preserves the spatial relationship between pixels in the image by learning image features using small patches (usually squares) of input data. Thus, the core computation required for CNNs is a three-dimensional (3D) convolution, which may be implemented in software using an image-to-column (IM2COL) transformation of image data followed by generic matrix multiplication (GEMM) operation.

A hardware accelerator for a CNN may follow a similar approach, providing hardware acceleration for the IM2COL transformation and the GEMM operation. The most common approach for performing the GEMM operation is to use a systolic array, which consists of a two-dimensional (2D) grid of multiply-accumulate (MAC) units, each connected to its neighbors to pass operands and results in a regular fashion. Systolic arrays are efficient because the communication is kept local (register to register) for as long as possible, which reduces the number of static random access memory (SRAM) and main memory accesses. This approach is often referred to as 'operand re-use'.

Figure 1:
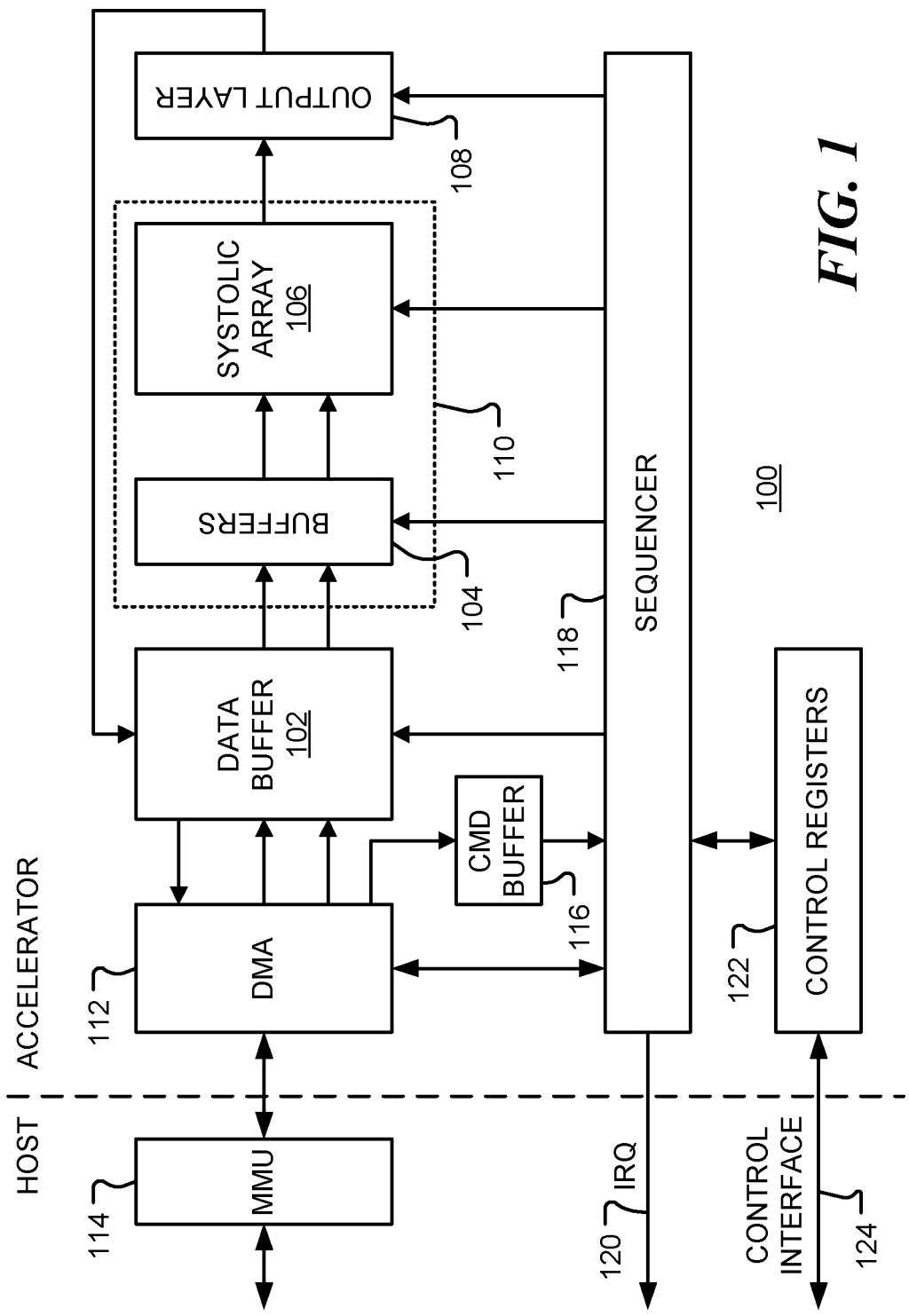
FIG. 1 is a simplified block diagram of data processing system with a convolutional neural network accelerator, in accordance with various representative embodiments.

FIG. 1 is a simplified block diagram of a data processing system in accordance with various embodiments of the disclosure. The elements to the right of the vertical broken line form a hardware accelerator 100 for a CNN, while the elements to the left of the broken line relate to a host processor. The CNN accelerator 100 reads data (e.g. image data and kernel weights) from data buffer 102, transforms the data in transposing buffers 104 and computes a matrix multiplication in systolic array 106. The output from systolic array 106 is processed in output layer 108 before being stored back in data buffer 102. In one embodiment, output layer 108 contains circuitry that applies a non-linear function to the output feature values. In addition, output layer 108 may perform data normalization and pooling functions. Sequencing of the input processing may be selected such that output values are generated for each output pool in turn. Various embodiments of the present disclosure relate to the combination of the transposing buffer 104 and systolic array 106 to form a convolution accelerator 110 for the convolutional layers of a CNN.

In the embodiment shown, accelerator 100 includes a direct memory access (DMA) unit 112 that retrieves data to be processed from a host data processing system via memory management unit (MMU) 114 of the host data processing unit. MMU 114 may provide a Translation Buffer Unit (TBU) and/or Translation Look-aside Buffer (TLB) for memory address translation and caching memory page tables. MMU 114 may provide a data-streaming interface, for example, to receive image data and return inferred features. DMA unit 112 also retrieves commands that are stored in command buffer 116. The commands control operation of sequencer 118. In turn, sequencer 118 synchronizes operation of DMA unit 112, data transformer 104, systolic array 106 and output layer 110. Upon completion of an operation, sequencer 118 may signal a host data processing system via an interrupt request (IRQ) signal 120.

Control registers 122 may be provided. In the embodiment shown, these registers may be connected to the host data processing system via a bus 124. This may be an Advanced High-performance Bus (AHB), for example. Thus, accelerator circuit 100 provides an interface to a host data processing system, through DMA unit 112 and bus 124, for example, that enables the accelerator to exchange data and commands with the host data processing system.

In general, circuit 100 is configured for performing convolutional neural network computations for a neural network. The circuit includes buffers 104 that include a transposing buffer and a weight buffer. The transposing buffer is two-dimensional buffer that receives actuation feature vectors (patch values) along a first dimension and outputs feature component vectors along a second dimension to systolic array 106. The weight buffer is also a two-dimensional buffer that is configured to store kernel weight vectors along a first dimension and to output kernel component vectors along a second dimension. As will be discussed below, systolic array 106 is configured to receive the kernel weight vectors along a first dimension and to receive the feature component vectors along a second dimension. The systolic array comprises an array of multiply and accumulate (MAC) processing cells.

By way of explanation, some implementations of the convolution accelerator 110 are described below with reference to a simple example. As will be apparent to those of ordinary skill in the art, these simple examples may be expanded to higher dimensions.

Each layer of a CNN receives, as input, a set of actuation features. These will be referred to herein as input features or as actuation features. For image processing, the actuation features comprise the image data itself. Each pixel in the image comprises one or more values. For example, an N×M image A may be written as an array of pixel feature vectors $$A = \begin{bmatrix} a(0,0) & a(0,1) & \ldots & a(0, M-1) \\ a(1,0) & a(1,1) & \ldots & a(1, M-1) \\ \vdots & & & \vdots \\ a(N-1, 0) & \ldots & \ldots & a(N-1, M-1) \end{bmatrix} \quad (1)$$

where, for a color image with R, G, B components or channels, the pixel feature vector at position (x, y) is given by $$a(x,y) = [a_{xy}^R a_{xy}^G a_{xy}^B]^T. \quad (2)$$

The terms $a_{xy}^R$, $a_{xy}^G$ and $R_{xy}^B$ are the three components or channels of the feature a(x, y). The image is an example of an input feature map. More generally, an input feature map may have any number of components or channels, where the components are values of feature components. The disclosed hardware accelerator is not limited to the processing of image data and may be used generally to process data arrays of the form given in equation (1). The acceleration produces an output feature map, which may be processed further in the output processor before being fed back into the accelerator to iteratively produce new output feature maps.

By way of example, the description below is based upon image processing using a number of kernels or filters each with dimension 2×2×L. However, the extension to larger kernels will be apparent to those of ordinary skill in the art. The $n^{th}$ kernel may be written as $$F^n = \begin{bmatrix} f_0^n & f_2^n \\ f_1^n & f_3^n \end{bmatrix}, \text{ where } f_i^n = [f_{i,0}^n \ f_{i,1}^n \ \ldots \ f_{i,L-1}^n]^T \quad (3)$$

and where $f_{i,j}^n$ are weight component values. The terms $f_i^n$ will be referred herein to as 'kernel weight vectors'. Other size kernels may be represented in similar manner. Herein, lowercase bold type will be used to denote vector quantities, while uppercase bold type is used to denote matrix quantities. Each location in an image or feature map comprises a number of components or layers. A patch in the image or feature map is a collection of neighboring locations and is represented by a three-dimensional block of data. The output is obtained by applying the kernel to patches in the image or feature map. In this simple example, the $n^{th}$ component of the output obtained by applying the $n^{th}$ kernel to patch p, q. The output is $$P^n(p,q) = [\ a^T(i_p^0, j_q^0) \ a^T(i_p^1, j_q^1) \ a^T(i_p^2, j_q^2) \ a^T(i_p^3, j_q^3)\ ] \begin{bmatrix} f_0^n \\ f_1^n \\ f_2^n \\ f_3^n \end{bmatrix} = \quad (4)$$

$$v_{p,q}^T k_n,$$

where the indices $i_p^n = i_p + i_n$, $j_q^n = j_q + j_n$, denote coordinates of the elements in the patch, and where $i_n$ and $j_n$ offsets from a reference position $(i_p, j_q)$ for the patch. The vectors in the inner product on the right side of (4) are given by $$v_{p,q} = \begin{bmatrix} a(i_p^0, j_q^0) \\ a(i_p^1, j_q^1) \\ a(i_p^2, j_q^2) \\ a(i_p^3, j_q^3) \end{bmatrix}, \text{ and } k_n = \begin{bmatrix} f_0^n \\ f_1^n \\ f_2^n \\ f_3^n \end{bmatrix}. \quad (5)$$

Multiple patches and L features may be computed together as a general matrix multiplication written as $$P = \begin{bmatrix} v_{0,0}^T \\ \vdots \\ v_{p,q}^T \\ \vdots \end{bmatrix} [k_0 \quad k_1 \quad \ldots \quad k_{L-1}] = V^T K. \quad (6)$$

where $$V = [v_{0,0} \quad \ldots \quad v_{p,q} \quad \ldots], K = [k_0 \quad k_1 \quad \ldots \quad k_{L-1}]. \quad (7)$$

However, it is noted that $v_{p,q}{}^T k_n = k_n{}^T v_{p,q}$, the roles of k and v may be reversed in the description that follows. The columns of the actuation matrix V (rows of $V^T$) are referred to herein as 'actuation vectors', while the rows of matrix V (columns of $V^T$) are referred to herein as 'feature component vectors'. Similarly, the columns of the kernel matrix K are referred to herein as 'kernel weight vectors' while the rows are referred to as 'kernel component vectors'.

The computation has two parts: (i) rearrangement of the image matrix (or input feature map) A into the actuation matrix $V^T$ and (ii) computation of the matrix product $P = V^T K$. In accordance with the present disclosure, the rearrangement is performed by a data transpose buffer and the matrix product is computed by a corresponding systolic array. It is noted that the data transpose buffer and systolic array work together and their structures are interdependent. The number of rows in the actuation matrix $V^T$ and number of kernels that can be computed in each one complete operation are determined by the dimensions of the systolic array. When the input feature map or number of kernels is larger than can be computed by the hardware, the computation may be broken down into a number of smaller computations.

Matrix Product

Operation of the systolic array is described below with reference to FIGS. 2-4.

Figure 2:
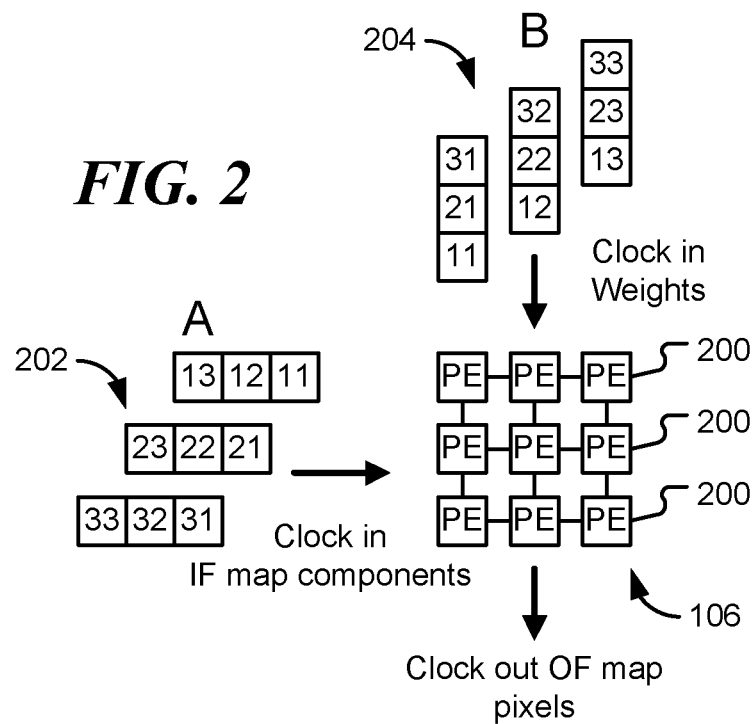
FIG. 2 is a diagrammatic representation of the operation of systolic array, in accordance with various representative embodiments.

FIG. 2 is a diagrammatic representation of the operation of systolic array 106. Systolic array 106 comprises an array of multiply-accumulate (MAC) processing elements 200, also referred to as cells. The processing elements are discussed in more detail below with reference to FIG. 5. The figures illustrate the multiplication of two 3×3 arrays, A and B, where the output is C=A×B. Systolic array 106 consumes an array of operands along one or more edges and at some point, emits results. Referring to FIG. 2, systolic array 106 receives input feature (IF) activation values 202 at the left edge of the array and filter weights 204 at the top edge. After the calculation is finished, pixel values of the completed output feature (OF) map are shifted out from array 106 from top to bottom. Inputs are clocked into the array and outputs are clocked out of the array, so the organization and sequencing of operands and results is very regular. In addition, the processing avoids dynamic or conditional sequencing. This is in contrast to prior approaches, in which weight values are pre-loaded into a systolic array and then inputs are clocked into the array.

The systolic array 106 uses data pipelining. Matrix A, stored in buffer 202, is clocked into the array from the left and moves one cell to right at each clock cycle, while matrix B, stored in buffer 204, is clocked in from above and moves one cell down the array at each clock cycle. Thus, at time t=1, the accumulator in cell (i, j) is initialized as $S_{ij}{}^1 = 0$, then performs the MAC operation $S_{ij}{}^{t+1} = S_{ij}{}^t + a_{i,t-i} b_{t-j,j}$, for t=1, 2, . . . , 6.

Figure 3:
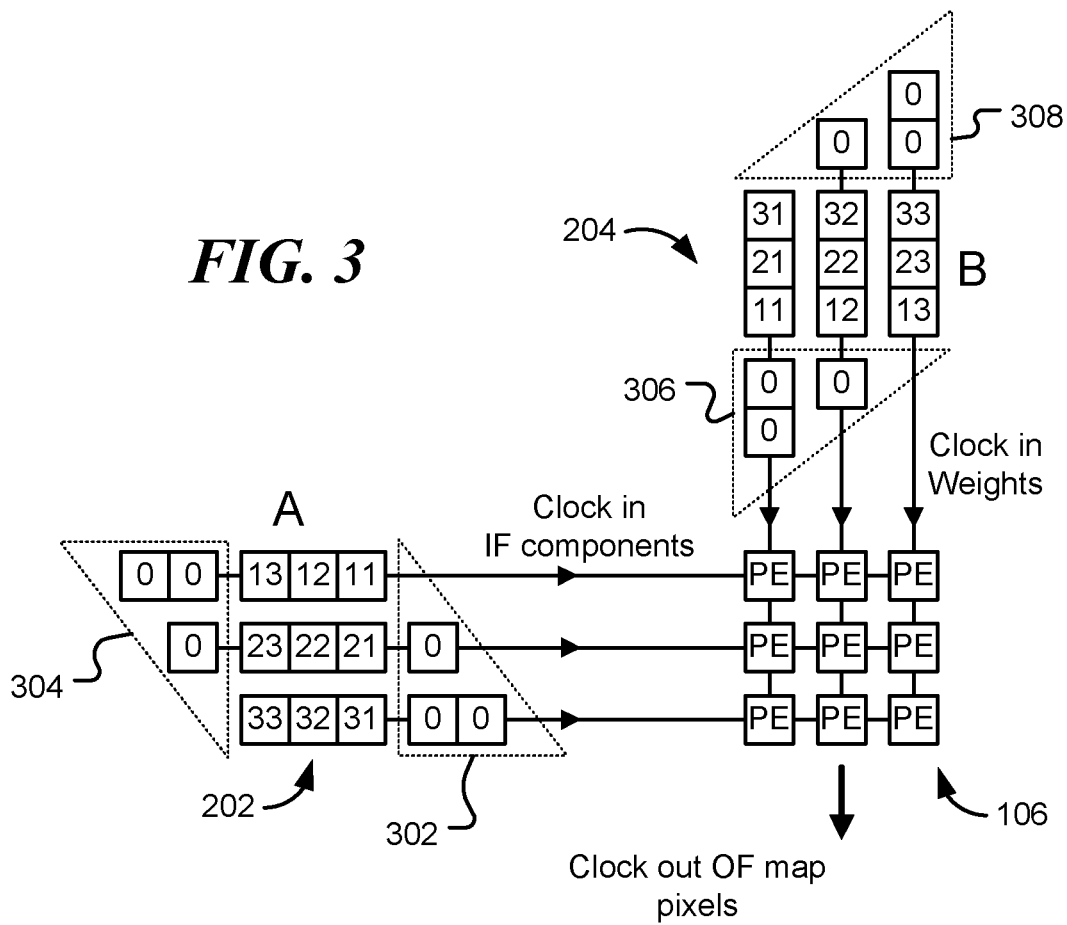
FIG. 3 is a diagrammatic representation of operation of a systolic array using pipelining, in accordance with various representative embodiments.

FIG. 3 is a diagrammatic representation of an embodiment in which elements to be processed are shifted left to right from the buffer containing matrix A. Storage cells 302 provide time-alignment of data entering the systolic array. Storage cells 302 and 304 are initially set to zero and provide zero padding of the data entering the systolic array. Each row of the buffer 202 may be configured as a circular buffer so that a value shifted out to the systolic array at the right edge of the buffer is also shifted back into the row at the opposite edge. When a computation is complete (after 5 cycles in this simple example), the zeros are back in their original positions and the elements of matrix A are aligned to allow for shifting the vertical direction. Similarly, storage cells 306 and 308 allow for circular shifting and time alignment of the columns in buffer 204.

Figure 4:
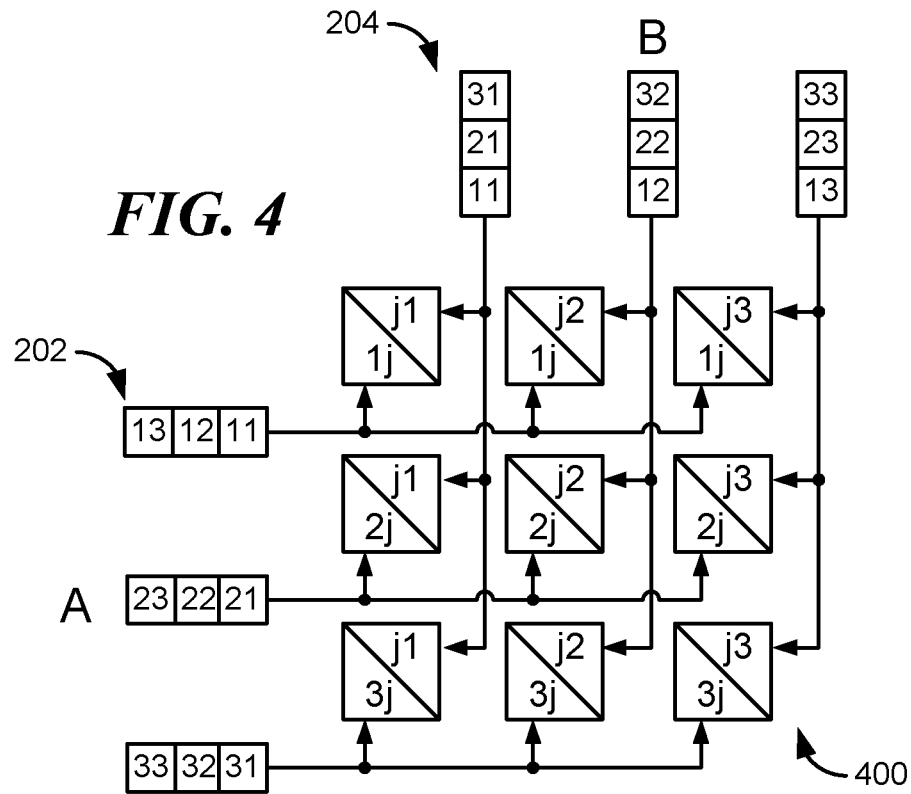
FIG. 4 is diagrammatic representation of operation of a systolic array using broadcasting, in accordance with various representative embodiments.

FIG. 4 is diagrammatic representation of matrix multiplication using a systolic array 400 with broadcasting. Elements of matrices A and B are 'broadcast' to the systolic array 400, in that each matrix element is simultaneously passed to multiple cells (3 in this simple example). In this embodiment, cell (i, j) performs the MAC operation $S_{ij}{}^{t+1} = S_{ij}{}^t + a_{i,t} b_{t,j}$, for t=1, 2, 3. This approach requires fewer clock cycles than the pipelining approach to complete the computation, but requires additional wiring to broadcast the matrix elements.

In a further broadcast approach, elements could be copied from cell to cell prior to the MAC operation. This approach may be implemented using simpler hardware, but requires many more clock cycles.

In each of the systolic arrays described above, the output has a stationary dataflow. That is, the computation for a given output is computed by a single processing element of the array. This is achieved by implementing the accumulator function inside the processing element, as discussed below with reference to FIG. 5. This is in contrast to the prior approaches in which accumulated partial sums of products are passed through the array during a computation.

A systolic array may have any size and may be square or rectangular. For example, an array may comprise 32×32 cells or 256×256 cells arranged in a square. The transposing buffer may be sized to match the systolic array.

Figure 5:
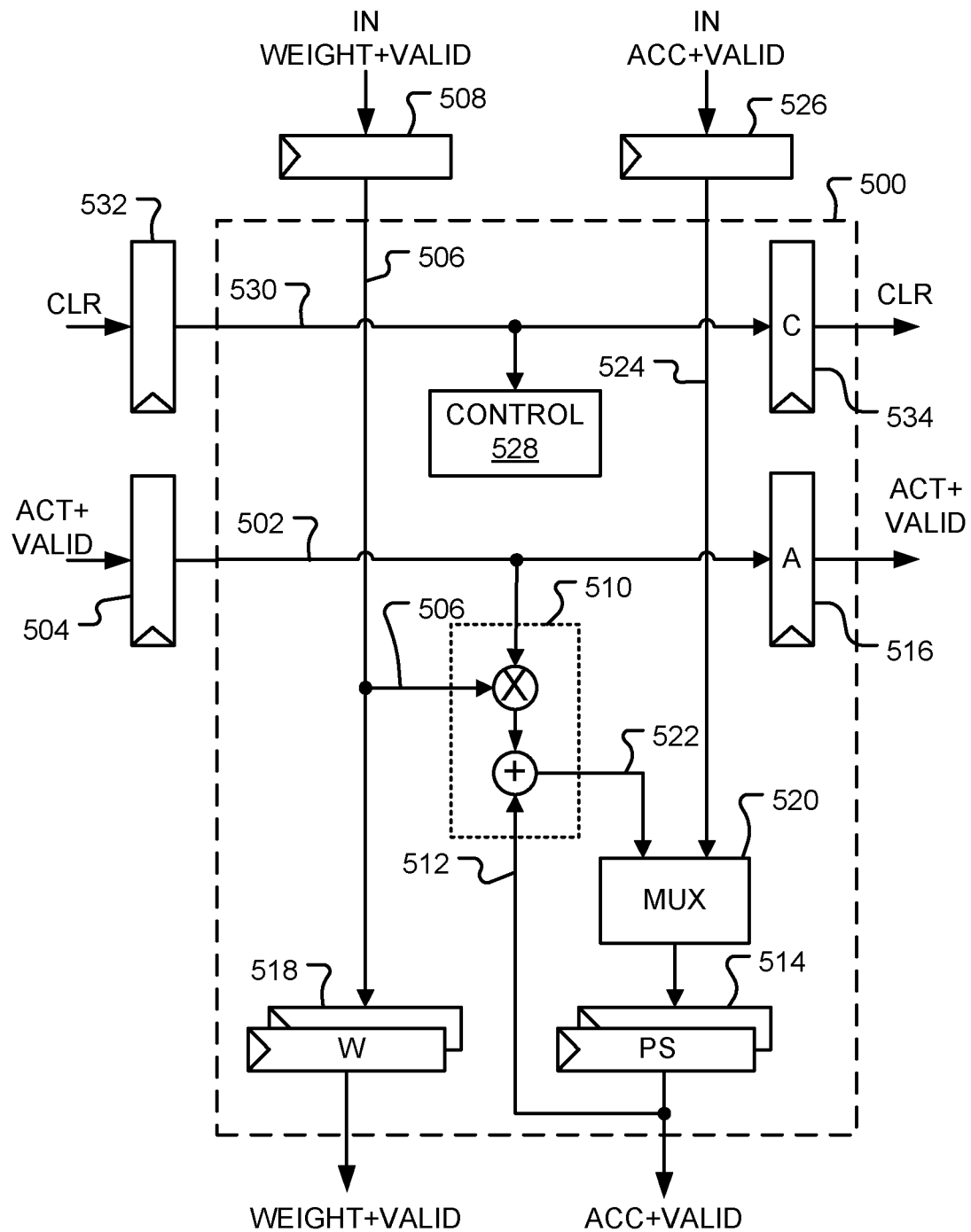
FIG. 5 is a block diagram of a processing element, or cell, of a systolic array, in accordance with various representative embodiments.

FIG. 5 is a block diagram of an exemplary processing element or cell 500 of a systolic array, in accordance with embodiments of the disclosure. In each clock cycle, the cell receives an actuation value on line 502, from a neighboring cell or edge register 504, and a weight value 506 from neighboring cell or edge register 508. These values are multiplied together in MAC 510 and added to prior accumulated value 512. The accumulated value is received from partial sum of products register 514. Actuation value is stored in register 516 and the weight value is stored in register 518. The partial sum of products register 514 may provide more bits of storage than registers 516 and 518. For example, registers 516 and 518 may contain 8 bits, while register 514 may contain 32 bits. Other sized registers may be used.

At the start of a computation of an element of the output feature map, partial sum of products register 514 is set to zero. Within a computation, multiplexer 520 is set to update the register with the new accumulated value 522. After completion of the computation, register 514 contains the accumulated sum of products of the cell while register 526 contains the accumulated sum of products of a neighboring cell. Multiplexer 520 may be set to enable accumulated sum of products, such as 524 received from register 526 of a neighboring cell, to be shifted out of the systolic array.

Operation of the cell may be controlled by control unit 528. The control unit may receive a control signal on line 530 from a register 532 of a neighboring cell. The control signal may be stored in register 534 for passing to neighboring cell to the right. The control signal may be, for example, a 'clear' signal to cause the partial sum of products register 514 to be reset to zero, or a signal to control multiplexer 520.

Inputs may be tagged with an additional bit to indicate when the data is invalid. The tag bit may be used in a cell, for example, to indicate when a partial sum of products register should be reset to zero.

Data Rearrangement

As discussed above, the convolution computation has two parts: (i) rearrangement of the image matrix (or input feature map) A into the actuation matrix $V^T$ and (ii) computation of the matrix product $P=V^T K$. The systolic array described above performs the matrix product. The description below describes various embodiments of the rearrangement of an image or other feature map.

The kernels are applied, in turn, to blocks of data called patches. In some applications, the patches overlap one another in the input feature map. For example, for four overlapping patches along a row, the actuation matrix is $$V^T = \begin{bmatrix} a^T(0,0) & a^T(1,0) & a^T(0,1) & a^T(1,1) \\ a^T(0,1) & a^T(1,1) & a^T(0,2) & a^T(1,2) \\ a^T(0,2) & a^T(1,2) & a^T(0,3) & a^T(1,3) \\ a^T(0,3) & a^T(1,3) & a^T(0,4) & a^T(1,4) \end{bmatrix}. \tag{8}$$

Each row of the matrix corresponds to one patch. In equation (8), the indices denote offsets from a common patch reference position. It is also noted that each entry in the matrix is a component row vector. For example, with R, G, B components the matrix has 4 rows (one for each patch) and 12 columns (3 components for each of the 4 map locations). Each column is referred to herein as a feature component vector. Since the matrix is fed into the systolic array one column at a time (i.e. one feature component vector at a time), the result can be obtained by consecutively feeding in the matrices $$V_1^T = \begin{bmatrix} a^T(0,0) & a^T(1,0) \\ a^T(0,1) & a^T(1,1) \\ a^T(0,2) & a^T(1,2) \\ a^T(0,3) & a^T(1,3) \end{bmatrix} = \begin{bmatrix} a_{00}^R & a_{00}^G & a_{00}^B & a_{10}^R & a_{10}^G & a_{10}^B \\ a_{01}^R & a_{01}^G & a_{01}^B & a_{11}^R & a_{11}^G & a_{11}^B \\ a_{02}^R & a_{02}^G & a_{02}^B & a_{12}^R & a_{12}^G & a_{12}^B \\ a_{03}^R & a_{03}^G & a_{03}^B & a_{13}^R & a_{13}^G & a_{13}^B \end{bmatrix}, \tag{9}$$

$$V_2^T = \begin{bmatrix} a^T(0,1) & a^T(1,1) \\ a^T(0,2) & a^T(1,2) \\ a^T(0,3) & a^T(1,3) \\ a^T(0,4) & a^T(1,4) \end{bmatrix} = \begin{bmatrix} a_{01}^R & a_{01}^G & a_{01}^B & a_{11}^R & a_{11}^G & a_{11}^B \\ a_{02}^R & a_{02}^G & a_{02}^B & a_{12}^R & a_{12}^G & a_{12}^B \\ a_{03}^R & a_{03}^G & a_{03}^B & a_{13}^R & a_{13}^G & a_{13}^B \\ a_{04}^R & a_{04}^G & a_{04}^B & a_{14}^R & a_{14}^G & a_{14}^B \end{bmatrix}.$$

Again, the rows of $V^T$ are referred to herein as 'actuation vectors', while the columns of $V^T$ are referred to herein as 'feature component vectors'. In equation (9), it is noted that $V_2^T$ may be obtained from $V_1^T$ by shifting out the first row and shifting in the new last row. Thus, the matrices may be conveniently implemented as a two-dimension array of registers that allow register-to-register shifting in both dimensions. This transposing buffer is filled by row-by-row by shifting in image data and then emptied column-by-column by shifting out into the systolic array. The accumulators of the systolic array are reset after all columns of both $V_1^T$ and $V_2^T$ have been loaded and processed. As mentioned above, the roles of k and v may be reversed. However, in either case, the feature components are stored along one dimension of the buffer while image data is (or other input feature map data) loaded along the other dimension.

Much of the data in matrix $V_1^T$ is reused in matrix $V_2^T$. This provides improved efficiency of operation and reduces the amount of data access/movement needed.

Figure 6:
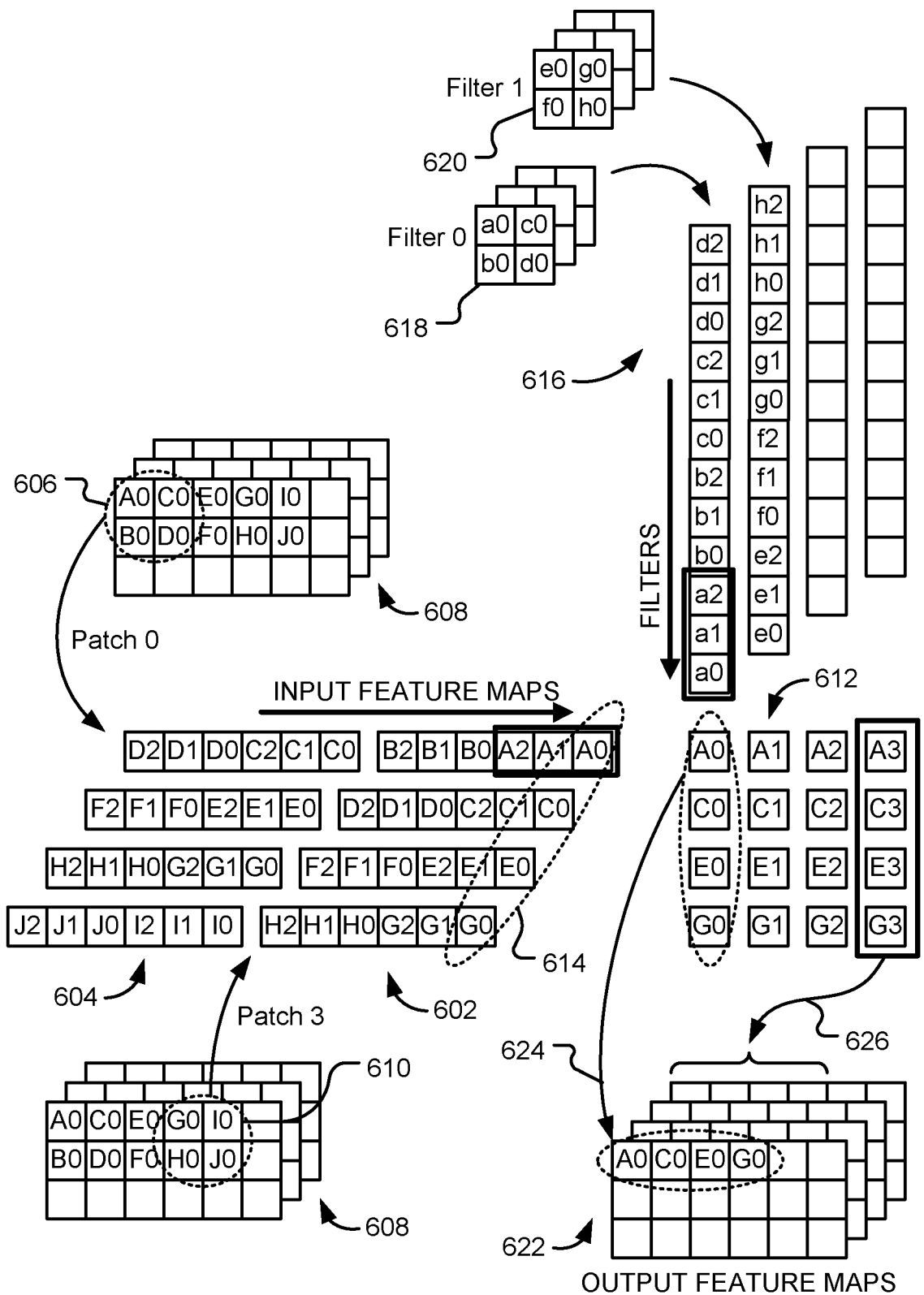
FIG. 6 is a diagram illustrating operation of a convolution accelerator, in accordance with various representative embodiments.

FIG. 6 is a diagram illustrating operation of a convolution accelerator in accordance with embodiments of the disclosure. In this example, the first (rearranged) input matrix 602 is denoted as $$V_1^T = \begin{bmatrix} A0 & A1 & A2 & B0 & B1 & B2 \\ C0 & C1 & C2 & D0 & D1 & D2 \\ E0 & E1 & E2 & F0 & F1 & F2 \\ G0 & G1 & G2 & H0 & H1 & H2 \end{bmatrix}. \tag{10}$$

FIG. 6 provides an overview of the output stationary z-first dataflow, so called because the columns of the matrix $V^T$ contain the z-components (i.e. color components or feature components) of the actuation data whereas the pixel array is in the x-y plane. This allows the input feature map data to be shifted into the array using large contiguous reads from the data buffer.

The second input matrix 604 is obtained by shifting the rows upwards and inserting a new row at the bottom of the matrix. A single data staging operation is required, where a vector of z-first data is loaded into a first-in, first-out (FIFO) for each row. As will be discussed in more detail below with reference to FIG. 7, this data rearrangement may be implemented using a transpose re-ordering for which a simple micro-architecture may be used. Weights are similarly arranged, although the constraints on the weights are much more easily met.

The top row of the combined matrix corresponds to the first patch 606 in the input feature map 608 (before rearrangement), while the bottom row corresponds to the patch 610 in the input feature map 608. In operation, the matrix 602 is clocked into one edge of systolic array 612 one column at a time, starting with column 614. The matrix of kernels or filter weights 616 is clocked into systolic array 612 along a second edge. Each column of array 616 corresponds a set of filter weights. For example, the leftmost column contains filter weights from filter 618 and the next column contains filter weights from filter 620.

Each cell of systolic array 612 accumulates one element of output feature map 622. For example, first column 624 provides a first row of the first component of output feature map 622, while the last column 626 provides the first row of the last component of output feature map 622.

With non-overlapping patches, the first four patches along a row of the image are computed from the actuation matrix $$V^T = \begin{bmatrix} a^T(0,0) & a^T(1,0) & a^T(0,1) & a^T(1,1) \\ a^T(0,2) & a^T(1,2) & a^T(0,3) & a^T(1,3) \\ a^T(0,4) & a^T(1,4) & a^T(0,5) & a^T(1,5) \\ a^T(0,6) & a^T(1,6) & a^T(0,7) & a^T(1,7) \end{bmatrix}. \tag{11}$$

While there is no data reuse, the data rearrangement is may be efficiently loaded from a transposing buffer. The buffer may hold the complete actuation matrix, or sequential sub-matrices such as $$V_1^T = \begin{bmatrix} a^T(0,0) \\ a^T(0,2) \\ a^T(0,4) \\ a^T(0,6) \end{bmatrix} = \begin{bmatrix} a_{00}^R & a_{00}^G & a_{00}^B \\ a_{02}^R & a_{02}^G & a_{02}^B \\ a_{04}^R & a_{04}^G & a_{04}^B \\ a_{06}^R & a_{06}^G & a_{06}^B \end{bmatrix}, \quad (12)$$

$$V_2^T = \begin{bmatrix} a^T(1,0) \\ a^T(1,2) \\ a^T(1,4) \\ a^T(1,6) \end{bmatrix} = \begin{bmatrix} a_{10}^R & a_{10}^G & a_{10}^B \\ a_{12}^R & a_{12}^G & a_{12}^B \\ a_{14}^R & a_{14}^G & a_{14}^B \\ a_{16}^R & a_{16}^G & a_{16}^B \end{bmatrix}, \text{ etc.}$$

The data rearrangement or staging required for the input feature map in the dataflow described above can be implemented as a simple transposing buffer structure. In particular, a transposing FIFO may be used. Unlike prior approaches, it is not necessary to use a multi-ported register file structure and address generators.

Figure 7:
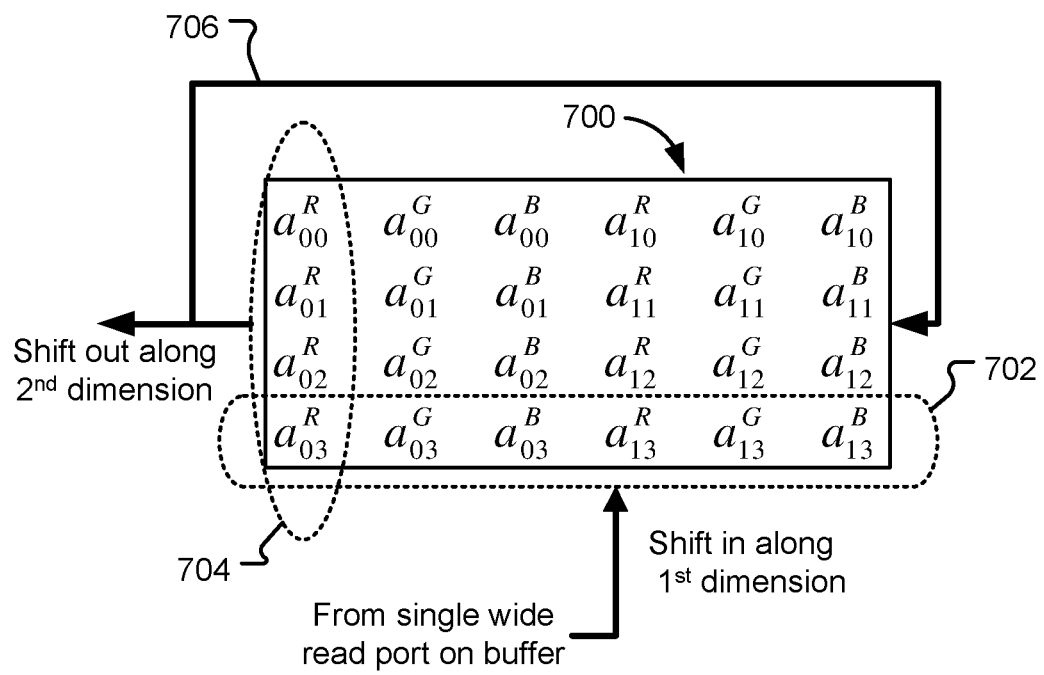
FIG. 7 is a diagrammatic representation of a transposing buffer, in accordance with various representative embodiments.

FIG. 7 is a diagrammatic representation of a transposing buffer 700 in accordance with embodiments of the disclosure. Buffer 700 may be any size and is used to rearrange actuation data to be loaded into a systolic array. Data is loaded into the buffer rows (a first dimension of the buffer) one vector of words at a time as depicted by row 702. Once the structure is full, columns (a second dimension of the buffer) can be read out into the MAC array. For example, column 704 may be read out first, followed by the other elements. The read-out order should match the order in which kernel weights are read into the systolic array. In this way, the input array is automatically transposed. The load/drain latency can be hidden with double buffering.

It is noted that the terms 'row' and 'column' may be interchanged in other embodiments. In general data is loaded along a first dimension and output along a second dimension, perpendicular to the first dimension.

When patches are overlapping, transpose buffer 700 may be operated as a FIFO buffer. One or more new data rows are shifted into row 702, each of the data columns is shifted out from row 704. Each row may be implemented as a circular buffer, with columns output from the left hand edge of buffer 700 reinserted at the right hand edge, as depicted by arrow 706. When the patches are non-overlapping, all of the data may be shifted out and new data shifted after a computation is completed.

The transposing buffer 700 may be implemented in hardware using flip-flops or other suitable electronic elements in an integrated circuit.

The weight matrix may be stored and operated in a similar manner, with weights for each filter loaded along one dimension and output to the systolic array along the other dimension.

Method of Operation

Figure 8:
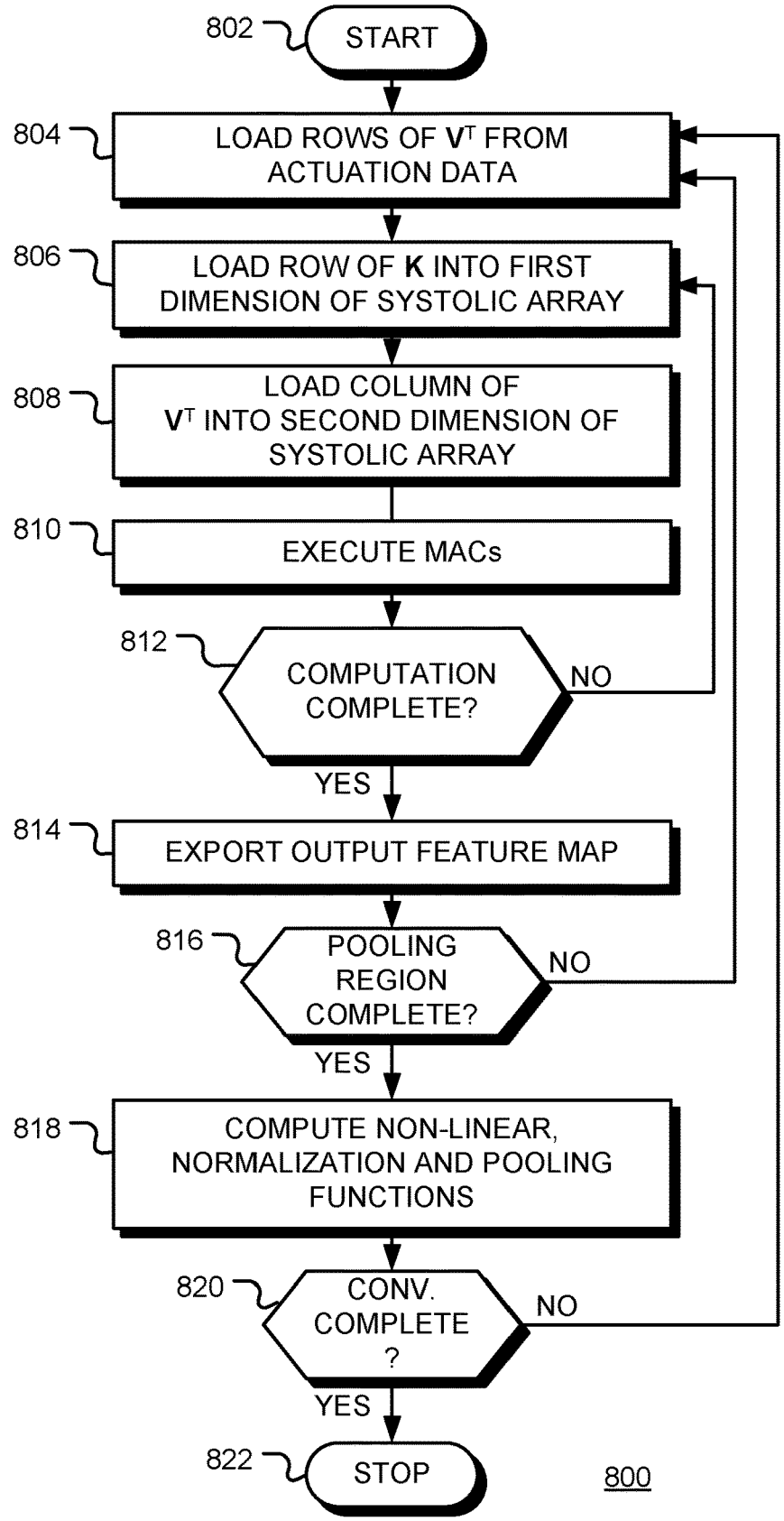
FIG. 8 is a flow chart of a method of operation of a hardware accelerator for a convolution layer of a convolutional neural network, in accordance with various representative embodiments.

FIG. 8 is a flow chart 800 of a method of operation of a hardware accelerator for a convolution layer of a CNN, in accordance with embodiments of the disclosure. Following start block 802, actuation data corresponding to rows of an input matrix $V^T$ are loaded into rows of a transposing buffer at block 804. Once the transposing buffer is full, rows of a kernel matric K are loaded into a first dimension or edge of a systolic array at block 806. At block 808, corresponding columns of the input matrix $V^T$ are loaded into a second dimension or edge of the systolic array. As each row of weights is loaded, data already in the array may be shifted down the array from cell to neighboring cell. Similarly, input data already loaded is shifted right from cell to neighboring cell. The systolic array performs a MAC operation on the data and weights to update accumulated partial sums at block 810. If the computation is incomplete, as depicted by the negative branch from decision block 812, flow returns to block 806. Otherwise, if the computation is complete, the accumulated sums of products are output from the systolic array at block 814. In one embodiment, this is achieved by passing accumulated sums of products between neighboring cells (in any direction) to an edge of the systolic array. If there are more data to be processed, as depicted by the positive branch from decision block 816, flow returns to block 804 and the transpose buffer is updated at block 804. If computation of all output values in a pooling region is complete, as depicted by the positive branch from decision block 816, output processing is performed. This may include performing non-linear, pooling and normalization functions on the output data in an output layer at block 818. If the full convolution is complete, as depicted by the positive branch from decision block 820, the process terminates at block 822, otherwise flow returns to block 804 to load more data.

Other elements may be included in the operation of the accelerator, including checking valid bits, responding to commands, resetting accumulated values, etc. These are omitted from FIG. 8 for ease of explanation.

While the present disclosure is susceptible of embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

As used herein, the term processor, controller or the like may encompass a processor, controller, microcontroller unit (MCU), microprocessor, and other suitable control elements. It will be appreciated that embodiments of the disclosure described herein may be implemented an integrated circuit. Some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A convolutional Neural Network consistent with the architecture disclosed above may be described by instructions of a Hardware Description Language. These instruction may be stored on a non-transitory computer readable medium. This enables distribution of the instructions. The instructions may be combined with instructions that describe other components of a data processing system to enable design and manufacture of hardware of the system. The disclosed architecture may also be described by a netlist representative that, again, may be stored on a non-transitory computer readable medium.

Accordingly, some aspects and features of the disclosed embodiments are set out in the following paragraphs:

In one embodiment, a circuit for performing convolutional neural network computations for a neural network comprises a transposing buffer configured to receive actuation feature vectors along a first dimension of the transposing buffer and to output feature component vectors along a second dimension of the transposing buffer; a weight buffer configured to store kernel weight vectors along a first dimension of the weight buffer and further configured to output kernel component vectors along a second dimension of the weight buffer; and a systolic array configured to receive the kernel weight vectors along a first dimension of the systolic array and to receive the feature component vectors along a second dimension of the systolic array, where the systolic array comprises an array of multiply and accumulate (MAC) processing cells.

In another embodiment of the circuit, the feature component vectors and the kernel component vectors are pipelined into the systolic array.

In another embodiment of the circuit, the feature component vectors and the kernel component vectors are broadcast into the systolic array.

In another embodiment of the circuit, the actuation feature vectors are shifted into the transposing buffer along the first dimension of the transposing buffer and output feature component vectors are shifted out of the transposing buffer along the second dimension.

In another embodiment of the circuit, the systolic array is further configured to pass the kernel weight vectors to neighboring processing cells in the second dimension of the systolic array and to pass the feature component vectors to neighboring processing cells in the first dimension of the systolic array.

In another embodiment of the circuit, the systolic array is further configured to output values accumulated in the processing cells, where each processing cell is associated with an output value.

Another embodiment of the circuit further comprises an output layer configured to receive accumulated values from the MAC processing cells of the systolic array and to perform at least one non-linear, pooling or normalization operations on the received accumulated values.

In another embodiment of the circuit, the values of the feature component vectors or the kernel component vectors are tagged with validity bits, indicative of data validity, and where an accumulator of a MAC processing cell is set to zero when data tagged as invalid is received.

Another embodiment of the circuit further comprises a control line coupled to the MAC processing cells, where an accumulator of a MAC processing cell is set to zero in response to a signal on the control line.

Another embodiment of the circuit further comprises an interface to a host data processing system, where the circuit is configured to receive data and commands from the host data processing system via the interface.

In one embodiment, a non-transitory computer readable medium contains instructions of a hardware description language that define the circuit described above.

In one embodiment, a non-transitory computer readable medium comprises a netlist representative of the circuit described above.

In one embodiment a method for performing convolution neural network computations for a neural network comprises loading input feature vectors into a transposing buffer along a first dimension of the transposing buffer; loading kernel weight vectors along a first dimension of a weight buffer; for each of a plurality of processing cycles: outputting kernel component vectors from a second dimension of the weight buffer to a first dimension of a systolic array, where the second dimension is perpendicular to the first dimension; outputting feature component vectors from a second dimension of the transposing buffer to a second dimension of the systolic array, where the second dimension is perpendicular to the first dimension and where the first dimension is perpendicular to the second dimension; and in each cell of the systolic array, accumulating a product of a feature component and a kernel component; and outputting accumulated products of the cells of the systolic array to an output layer of the neural network.

Another embodiment of the method further comprises, for each of the plurality of processing cycles: passing the kernel weight vectors to neighboring cells in the second dimension of the systolic array; and passing the feature component vectors to neighboring cells in the first dimension of the systolic array.

Another embodiment of the method further comprises, for each of the plurality of processing cycles: broadcasting the kernel weight vectors cells in the second dimension of the systolic array; and broadcasting the feature component vectors to cells in the first dimension of the systolic array.

In another embodiment of the method, loading input feature vectors into the transposing buffer along a first dimension of the transposing buffer comprises: shifting data stored in the transposing buffer in the second dimension; and loading an input feature vector along an edge of the transposing buffer in the first dimension.

In another embodiment of the method, outputting feature component vectors from the second dimension of the transposing buffer to the second dimension of the systolic array comprises: shifting data stored in the transposing buffer in the first dimension; and outputting a feature component vector along an edge of the transposing buffer in the second dimension.

In another embodiment of the method, a kernel weight vector is applied to a patch of pixels in an image, and where an input feature vector comprising color components of pixels in the patch; and a feature component vector comprises a color component of a corresponding pixel in each of a plurality of patches.

In another embodiment of the method, outputting accumulated sum of products of the cells of the systolic array to an output layer of the neural network comprises passing accumulated sum of products between neighboring cells of the systolic array to an edge of the systolic array.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A circuit for performing convolutional neural network computations for a neural network, the circuit comprising:
   a transposing buffer configured to store elements of a feature map, each element having a plurality of components, the transposing buffer including a two-dimensional array of registers that allow register-to-register shifting in both dimensions and the transposing buffer configured to receive actuation feature vectors along a first dimension of the transposing buffer and to output feature component vectors along a second dimension of the transposing buffer, each actuation feature vector including a plurality of components of one or more elements of the feature map and each feature component vector including a single component from each of a plurality of elements of the feature map;
   a weight buffer configured to store kernel weight vectors along a first dimension of the weight buffer and further configured to output kernel component vectors along a second dimension of the weight buffer; and
   a systolic array configured to receive the kernel weight vectors along a first dimension of the systolic array and to receive the feature component vectors along a second dimension of the systolic array,
where the systolic array comprises an array of multiply and accumulate (MAC) processing cells.

2. The circuit of claim 1, where the feature component vectors and the kernel component vectors are pipelined into the systolic array.

3. The circuit of claim 1, where the feature component vectors and the kernel component vectors are broadcast into the systolic array.

4. The circuit of claim 1, where the actuation feature vectors are shifted into the transposing buffer along the first dimension of the transposing buffer and output feature component vectors are shifted out of the transposing buffer along the second dimension.

5. The circuit of claim 1, where systolic array is further configured to pass the kernel weight vectors to neighboring processing cells in the second dimension of the systolic array and to pass the feature component vectors to neighboring processing cells in the first dimension of the systolic array.

6. The circuit of claim 1, where systolic array is further configured to output values accumulated in the processing cells, where each processing cell is associated with an output value.

7. The circuit of claim 1, further comprising an output layer configured to receive accumulated values from the MAC processing cells of the systolic array and to perform at least one non-linear, pooling or normalization operation on the received accumulated values.

8. The circuit of claim 1, where the values of the feature component vectors or the kernel component vectors are tagged with validity bits, indicative of data validity, and where an accumulator of a MAC processing cell is set to zero when data tagged as invalid is received.

9. The circuit of claim 1, further comprising a control line coupled to the MAC processing cells, where an accumulator of a MAC processing cell is set to zero in response to a signal on the control line.

10. The circuit of claim 1, further comprising an interface to a host data processing system, where the circuit is configured to receive data and commands from the host data processing system via the interface.

11. A non-transitory computer readable medium containing instructions of a hardware description language that define the circuit of claim 1.

12. A non-transitory computer readable medium comprising a netlist representative of the circuit of claim 1.

13. A method for performing convolution neural network computations for a neural network, the method comprising:
   shifting in input feature vectors into a transposing buffer along a first dimension of the transposing buffer, each input feature vector including a plurality of components of one or more elements of a feature map;
   loading kernel weight vectors along a first dimension of a weight buffer;
   for each of a plurality of processing cycles:
      outputting kernel component vectors from a second dimension of the weight buffer to a first dimension of a systolic array, where the second dimension is perpendicular to the first dimension;
      shifting out feature component vectors from a second dimension of the transposing buffer to a second dimension of the systolic array, each feature component vector includes a single component from each of a plurality of elements of the feature map, where the second dimension is perpendicular to the first dimension and where the first dimension is perpendicular to the second dimension; and
      in each cell of the systolic array, accumulating a product of a feature component and a kernel component; and
   outputting accumulated products of the cells of the systolic array to an output layer of the neural network.

14. The method of claim 13, further comprising, for each of the plurality of processing cycles:
   passing the kernel weight vectors to neighboring cells in the second dimension of the systolic array; and passing the feature component vectors to neighboring cells in the first dimension of the systolic array.

15. The method of claim 13, further comprising, for each of the plurality of processing cycles:
broadcasting the kernel weight vectors cells in the second dimension of the systolic array; and
broadcasting the feature component vectors to cells in the first dimension of the systolic array.

16. The method of claim 13, where loading input feature vectors into the transposing buffer along a first dimension of the transposing buffer comprises:
shifting data stored in the transposing buffer in the second dimension; and
loading an input feature vector along an edge of the transposing buffer in the first dimension.

17. The method of claim 13, where outputting feature component vectors from the second dimension of the transposing buffer to the second dimension of the systolic array comprises:
shifting data stored in the transposing buffer in the first dimension; and
outputting a feature component vector along an edge of the transposing buffer in the second dimension.

18. The method of claim 13, where a kernel weight vector is applied to a patch of pixels in an image, and where
an input feature vector comprising color components of pixels in the patch; and
a feature component vector comprises a color component of a corresponding pixel in each of a plurality of patches.

19. The method of claim 13, where outputting accumulated sum of products of the cells of the systolic array to an output layer of the neural network comprises passing accumulated sum of products between neighboring cells of the systolic array to an edge of the systolic array.

* * * * *